(12) United States Patent
Kanezaki (10) Patent No.: US 10,458,598 B2
(45) Date of Patent: Oct. 29, 2019

(54) HIGH PRESSURE TANK

(71) Applicant: HONDA MOTOR CO., LTD., Minato-ku, Tokyo (JP)

(72) Inventor: Toshihiko Kanezaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/917,960

(22) Filed: Mar. 12, 2018

(65) Prior Publication Data
US 2018/0266630 A1 Sep. 20, 2018

(30) Foreign Application Priority Data

Mar. 15, 2017 (JP) .................. 2017-049687

(51) Int. Cl.
*F17C 13/06* (2006.01)
*F17C 1/02* (2006.01)
*F17C 1/16* (2006.01)

(52) U.S. Cl.
CPC ............. *F17C 13/06* (2013.01); *F17C 1/02* (2013.01); *F17C 1/16* (2013.01); *F17C 2201/0109* (2013.01); *F17C 2201/056* (2013.01); *F17C 2201/058* (2013.01); *F17C 2203/012* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2209/234* (2013.01); *F17C 2221/012* (2013.01); *F17C 2270/0184* (2013.01); *Y02E 60/321* (2013.01)

(58) Field of Classification Search
CPC .... F17C 13/06; F17C 1/02; F17C 1/16; F17C 13/02

USPC ......................................................... 220/582
See application file for complete search history.

(56) References Cited

U.S. PATENT DOCUMENTS 9,845,878 B2    12/2017    Miura et al.

FOREIGN PATENT DOCUMENTS

| CN | 103016739 | 4/2013 |
| JP | 2013-137092 | 7/2013 |

(Continued)

OTHER PUBLICATIONS

Japanese Office Action for Japanese Patent Application No. 2017-049687 dated Dec. 11, 2018.

(Continued)

*Primary Examiner* — Anthony D Stashick
*Assistant Examiner* — L E Kmet
(74) *Attorney, Agent, or Firm* — Amin, Turocy & Watson LLP (57) ABSTRACT

A high pressure tank includes: a resin liner for containing a fluid; and a cap including a supply/discharge hole. A cylindrical portion formed with the liner in a protruding manner is inserted in the supply/discharge hole. In a seal groove formed in an inner circumferential surface of the supply/discharge hole, a seal member and a back-up member disposed on an upstream side of the seal member in the supply direction are provided. A tapered groove surface of the seal groove facing toward the back-up member is apart from the outer circumferential surface of the cylindrical portion along the supply direction. A tapered member surface of the back-up member facing toward the tapered groove surface has a diameter expanding along the supply direction.

2 Claims, 6 Drawing Sheets

(56) References Cited

FOREIGN PATENT DOCUMENTS

| JP | 2013137092 A | * | 7/2013 | ................ F17C 1/06 |
| JP | 2013-228019 | | 11/2013 | |
| JP | 2013228019 A | * | 11/2013 | |

OTHER PUBLICATIONS

Chinese Office Action and Search Report for Chinese Patent Application No. 201810209578.6 dated Apr. 16, 2019.

* cited by examiner

HIGH PRESSURE TANK

CROSS-REFERENCE TO RELATED APPLICATION

This application is based upon and claims the benefit of priority from Japanese Patent Application No. 2017-049687 filed on Mar. 15, 2017, the contents of which are incorporated herein by reference.

BACKGROUND OF THE INVENTION

Field of the Invention

The present invention relates to a high pressure tank that includes a liner that contains a fluid and is made of resin, and a cap that includes a supply/discharge hole that is formed to supply and discharge the fluid to and from the liner.

Description of the Related Art

High pressure tanks are widely used as containers that contain fluids such as gases and liquids. For example, a high pressure tank is mounted on a fuel cell vehicle as a container of a hydrogen gas to be supplied to a fuel cell system.

A high pressure tank of this type includes a liner whose outer surface is covered with a reinforced layer made of fiber-reinforced plastics and that is made of resin and is formed as a hollow body, and a cap that includes a supply/discharge hole that is formed therein to supply and discharge a fluid to and from the liner. A cylindrical portion is formed to protrude from the liner. This cylindrical portion is inserted into the supply/discharge hole. A valve is provided to the supply/discharge hole, and is operated to open and close the supply/discharge hole.

That is, it is possible to supply the fluid from the supply/discharge hole to the interior of the liner via the inside of the cylindrical portion. Further, it is possible to discharge the fluid in the liner via the inside of the cylindrical portion and the supply/discharge hole. Hence, a direction from a distal end side to a proximal end side of the cylindrical portion is a fluid supply direction to the liner. In other words, the direction from the proximal end side to the distal end side of the cylindrical portion is a fluid discharge direction for the liner.

According to this high pressure tank, a seal member seals between the liner and the cap. For example, Japanese Laid-Open Patent Publication No. 2013-137092 discloses arranging a seal member inside a seal groove formed in an inner circumferential surface of a supply/discharge hole, and thereby sealing between an outer circumferential surface of a cylindrical portion and the inner circumferential surface of the supply/discharge hole.

SUMMARY OF THE INVENTION

When an interior of a high pressure tank is depressurized due to discharge of the fluid, in the seal groove, an internal pressure on a side closer to a downstream in the supply direction than the seal member is higher than an internal pressure on the upstream side in the supply direction. Therefore, the seal member arranged as described above comes into pressing contact with an inner wall of the seal groove on the upstream side in the supply direction. As a result, part of the seal member is concerned to protrude into a gap between the outer circumferential surface of the cylindrical portion and the inner circumferential surface of the supply/discharge hole. That is, the high pressure tank disclosed in Japanese Laid-Open Patent Publication No. 2013-137092 needs to use a special seal member that can sufficiently withstand a stress caused by the protrusion, and increase the number of times of maintenance, and therefore increases manufacturing costs and makes handling complicated.

A main object of the present invention is to provide a high pressure tank that can suitably seal a gap between a liner and a cap by a simple configuration for a long period of time.

According to one embodiment of the present invention, a high pressure tank includes: a resin liner configured to contain a fluid; and a cap including a supply/discharge hole formed therein and configured to supply and discharge the fluid to and from the liner, wherein a cylindrical portion is formed with the liner in a protruding manner, in a state where the cylindrical portion is inserted in the supply/discharge hole, a direction from a distal end side to a proximal end side of the cylindrical portion is a supply direction of the fluid for the liner; a seal groove is formed in an inner circumferential surface of the supply/discharge hole, a seal member configured to seal a gap between the inner circumferential surface of the supply/discharge hole and an outer circumferential surface of the cylindrical portion and a back-up member disposed on an upstream side of the seal member in the supply direction are provided in the seal groove; the seal groove has a tapered groove surface facing toward the back-up member, the tapered groove surface becomes apart from the outer circumferential surface of the cylindrical portion from the upstream side to a downstream side in the supply direction; and the back-up member has a tapered member surface facing toward the tapered groove surface, the tapered member surface having a diameter expanding from the upstream side to the downstream side in the supply direction.

When an interior of this high pressure tank is depressurized, and a pressing force is applied to the seal member from the downstream side to the upstream side in the supply direction, the seal member comes into pressing contact with the back-up member. The tapered member surface of the back-up member to which the pressing force has been applied via the seal member is placed in pressing contact with the tapered groove surface of the seal groove. Thus, it is possible to generate a force component in a radial direction of the back-up member. Consequently, it is possible to suitably keep the back-up member in tight contact with the inner circumferential surface of the seal groove and the outer circumferential surface of the cylindrical portion.

Consequently, even when the pressing force toward the upstream side in the supply direction is applied to the seal member, the seal member can avoid from protruding in a gap between the outer circumferential surface of the cylindrical portion and the inner circumferential surface of the supply/discharge hole on the upstream of the seal groove in the supply direction. Further, the seal member is also effectively prevented from protruding between respective ends of the back-up member in the radial direction and the inner circumferential surface of the seal groove and the outer circumferential surface of the cylindrical portion.

Consequently, this high pressure tank does not need to use a special seal member that can withstand a stress caused by the protrusion, while making it possible to improve pressure resistance of the seal member. It is also not required to increase the number of times of maintenance. As a result, a simple configuration can seal a gap between the liner and the cap well for a long period of time.

In the high pressure tank, a maximum thickness in a radial direction of the back-up member is preferably smaller than a maximum depth of a groove formed by the tapered groove surface of the seal groove. In this case, in a state where the pressing force toward the upstream side in the supply direction is not applied to the back-up member, a gap is formed between the outer circumferential surface of the cylindrical portion and the back-up member.

By the way, when the fluid is supplied to pressurize the interior of the high pressure tank, the fluid having entered the seal groove from the upstream side of the supply direction places the seal member in pressing contact with the inner wall of the seal groove on the downstream side in the supply direction. In this case, the fluid also enters the gap formed between the outer circumferential surface of the cylindrical portion and the back-up member, as described above. Consequently, it is possible to make the pressing force of the fluid act on a portion of the outer circumferential surface of the cylindrical portion to which the seal member is not pressed.

Consequently, it is possible to produce a surface pressure substantially evenly in the entire outer circumferential surface of the cylindrical portion facing toward the seal groove. The portion of the cylindrical portion at which the seal member is pressed can be prevented from contracting and deforming due to a creep. That is, it is possible to prevent an increase in a distance (seal gap) between the outer circumferential surface of the cylindrical portion and the inner circumferential surface of the seal groove. It is possible to suitably seal the liner and the cap for a long period of time.

According to the high pressure tank, an inclination angle of the tapered member surface with respect to an axial direction of the back-up member is larger than an inclination angle of the tapered groove surface with respect to the axial direction of the supply/discharge hole. In a state where the tapered member surface is aligned with the tapered groove surface, a distance D1 between a first line and a second line is preferably equal to or greater than half of a distance D2 between the first line and a third line (D1≥0.5D2), the first line extending along the axial direction of the supply/discharge hole and passing through one end of the tapered member surface on the downstream side in the supply direction, the second line extending along the axial direction of the supply/discharge hole and passing through another end of the tapered member surface on the upstream side in the supply direction, the third line extending along the axial direction of the supply/discharge hole and passing through an end portion of the back-up member on the downstream side in the supply direction facing toward the outer circumferential surface of the cylindrical portion.

In this case, the inclination angle of the tapered member surface is larger than the inclination angle of the tapered groove surface. Therefore, in a state where the pressing force toward the upstream side in the supply direction is not applied, the tapered groove surface and the tapered member surface can be separated in part. That is, the tapered member surface is disposed such that, for example, the end portion on the downstream side in the supply direction is into contact with the tapered groove surface and a separate distance between the tapered member surface and the tapered groove surface increases toward the upstream side in the supply direction.

On the other hand, when the pressing force toward the upstream side in the supply direction is applied to the back-up member, the back-up member is deformed such that the upstream side in the supply direction of the tapered member surface having been separated from the tapered groove surface approaches the tapered groove surface, and the entire tapered member surface comes into contact with the tapered groove surface. The distance D1 and the distance D2 satisfy the above relationship, so that, when deformed as described above, the back-up member can have one end portion in the radial direction on the downstream side (a side facing toward the seal member) in the supply direction in contact with the outer circumferential surface of the cylindrical portion, and the other end portion kept in contact with the inner circumferential surface (tapered groove surface) of the seal groove.

That is, even when the maximum thickness in the radial direction of this back-up member is made smaller than the maximum depth of the portion at which the tapered surface of the seal groove is formed, in a state where the pressing force toward the upstream side in the supply direction is applied, both the end portions in the radial direction of the back-up member on the side facing toward the seal member can be in close contact with the inner circumferential surface of the seal groove and the outer circumferential surface of the cylindrical portion. It is possible to eliminate a concern that a gap into which the seal member protrudes is formed between the back-up member and the inner circumferential surface of the seal groove or the outer circumferential surface of the cylindrical portion.

As described above, according to this high pressure tank, the simple configuration can more effectively provide a function and an effect of making it possible to suitably seal the liner and the cap for a long period of time.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a high pressure tank according to the present invention will be described in detail below with reference to the accompanying drawings.

The high pressure tank according to the present invention is mounted on, for example, a fuel cell vehicle, and is suitably used to contain a hydrogen gas to be supplied to a fuel cell system. The present embodiment will describe an example where the high pressure tank contains a hydrogen gas as a fluid to be supplied to the fuel cell system, yet is not limited to this in particular. The high pressure tank according to the present invention can contain any fluid other than the hydrogen gas.

Figure 1:
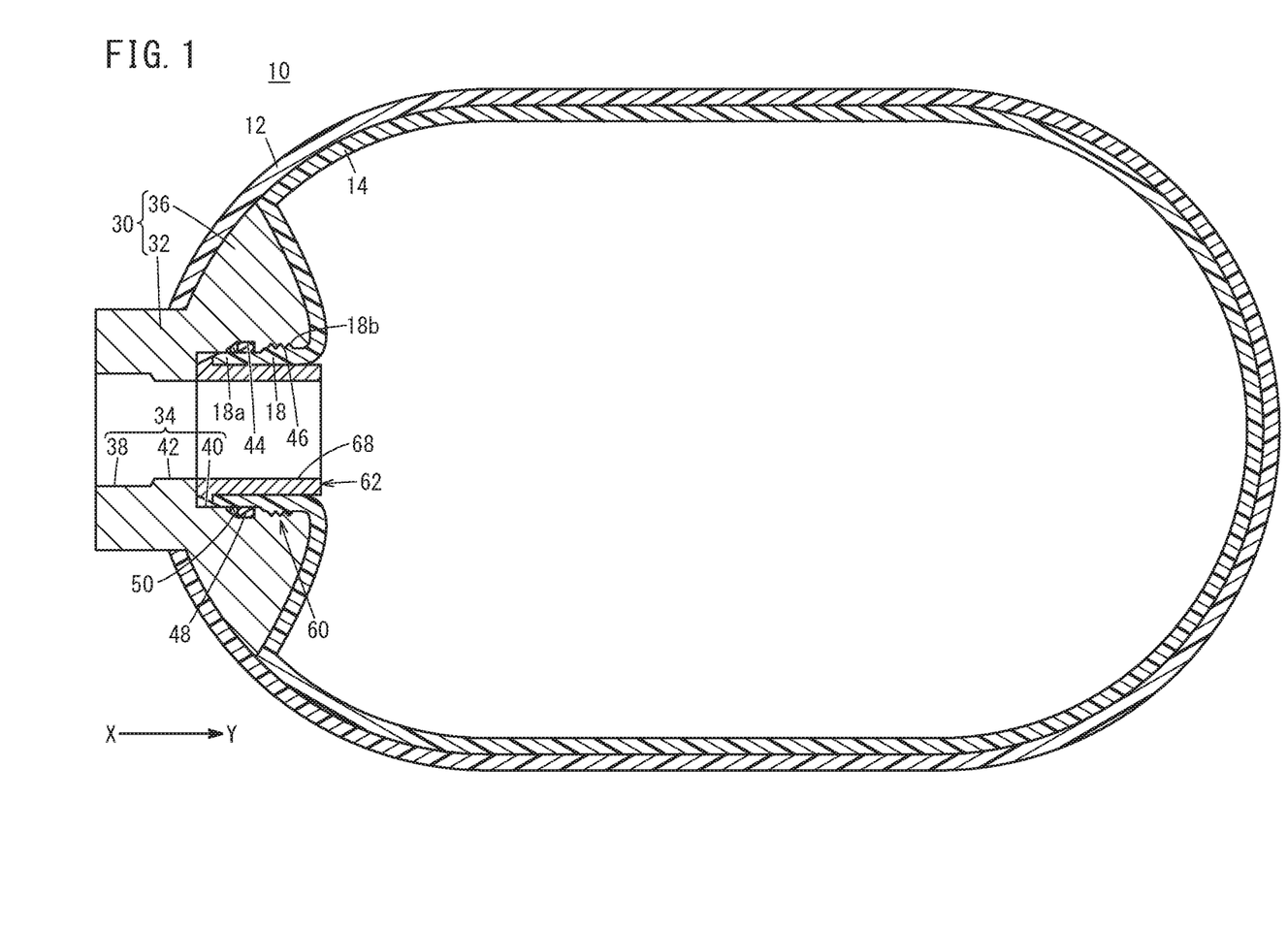
FIG. 1 is a schematic cross-sectional view of a main portion of a high pressure tank according to an embodiment of the present invention along an axial direction of a cylindrical portion of the high pressure tank.

As shown in FIG. 1, a high pressure tank 10 according to the present embodiment contains a hydrogen gas in a hollow interior of a liner 14 whose outer circumference is covered with a reinforced layer 12 made of fiber-reinforced plastics. The liner 14 is made of resin, and a cylindrical portion 18 is formed to protrude at one end of the liner 14 recessed inward once. The liner 14 including this cylindrical portion 18 can be easily obtained by applying a known blow molding method.

The inside of the cylindrical portion 18 communicates with the hollow interior of the liner 14. The cylindrical portion 18 includes a thin portion 18a on a protrusion end (distal end) side, and a male screw 18b on a side closer to a proximal end than the thin portion 18a. The thin portion 18a, although thinner than the other portions, preferably has a thickness of 1 mm or more for sufficient rigidity. As shown in FIG. 1, a cap 30 is fitted onto the cylindrical portion 18. The cap 30 is made of metal, for example, and includes a protrusion portion 32 of a cylindrical shape. A supply/discharge hole 34 is formed to penetrate along an axial direction of the protrusion portion 32. The cap 30 further includes a shoulder portion 36 that widens in a disk shape from the proximal end of the protrusion portion 32. An outer circumferential surface of the shoulder portion 36 is covered with the liner 14 and the reinforced layer 12. That is, the cap 30 has a shape that the shoulder portion 36 is covered by the liner 14 and the reinforced layer 12, and the protrusion portion 32 is exposed and protrudes through an opening of the reinforced layer 12.

An outer diameter of the protrusion portion 32 is substantially constant. On the other hand, an inner diameter of the protrusion portion 32, i.e., a diameter of the supply/discharge hole 34 varies by location. More specifically, the supply/discharge hole 34 includes a middle inner diameter hole 38 located on a side of the protrusion portion 32 in the axial direction, a large inner diameter hole 40 located on a side of the shoulder portion 36, and a small inner diameter hole 42 formed between the middle inner diameter hole 38 and the large inner diameter hole 40. The middle inner diameter hole 38 is detachably connected with a high pressure hose via a valve (none of which is shown).

The cylindrical portion 18 is inserted in the large inner diameter hole 40. Thus, an outer circumferential surface of the cylindrical portion 18 is disposed along an inner circumferential surface of the large inner diameter hole 40. That is, it is possible to supply the hydrogen gas from the supply/discharge hole 34 to the interior of the liner 14 via the inside of the cylindrical portion 18. Further, it is possible to discharge the hydrogen gas inside the liner 14 via the inside of the cylindrical portion 18 and the supply/discharge hole 34.

Hence, a direction from the distal end side to the proximal end side of the cylindrical portion 18 is a supply direction (the arrow direction in FIG. 1) of the hydrogen gas for the liner 14. In this description, irrespectively of whether the hydrogen gas is supplied or discharged, the direction (the arrow direction in FIG. 1) from the distal end side to the proximal end side of the cylindrical portion 18 is the supply direction. That is, the hydrogen gas is supplied to the liner 14 from an upstream side (arrow X side) to a downstream side (arrow Y side) in the supply direction, and is discharged from the liner 14 from the downstream side (arrow Y side) to the upstream side (arrow X side) in the supply direction.

An inner diameter of the large inner diameter hole 40 is set to a size matching an outer diameter of the cylindrical portion 18. More specifically, an inner diameter of a portion of the large inner diameter hole 40 facing toward the thin portion 18a is smaller than an inner diameter of a portion on a side closer to the proximal end than the thin portion 18a. An inner wall of the large inner diameter hole 40 includes, at a portion facing toward the thin portion 18a of the cylindrical portion 18, a seal groove 44 of an annular shape along a circumferential direction of the large inner diameter hole 40, and at a portion facing toward the male screw 18b of the cylindrical portion 18, a female screw 46 to be screwed on the male screw 18b. As shown at least in FIG. 3, a gap that is a hydrogen gas path is preferably formed between the inner wall of the large inner diameter hole 40 and an outer circumferential surface of the thin portion 18a on the upstream side of the seal groove 44 in the supply direction, for a reason described below.

Figure 2:
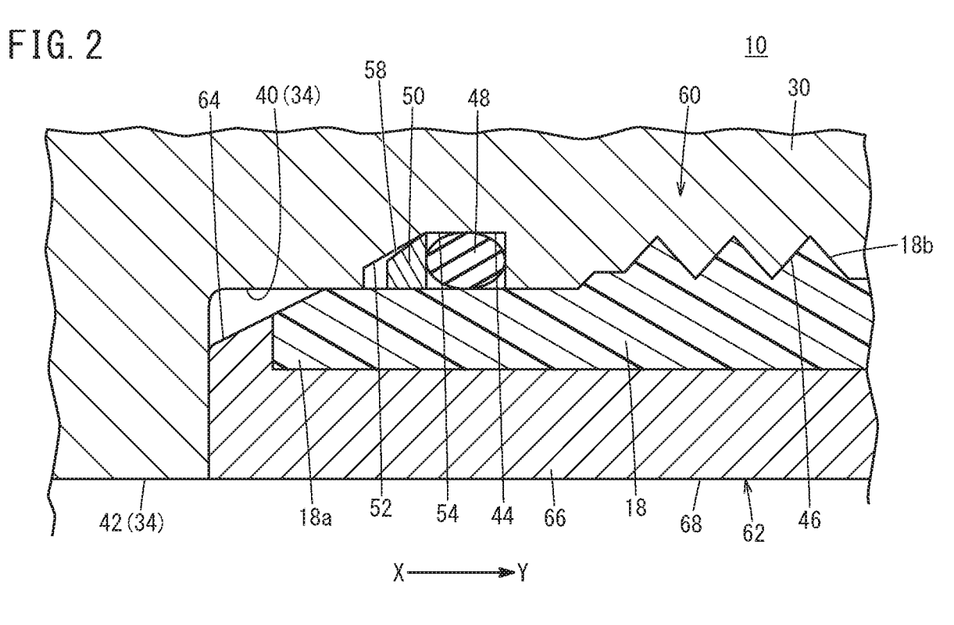
FIG. 2 is an enlarged cross-sectional view of an opening side of the high pressure tank shown in FIG. 1.
Figure 3:
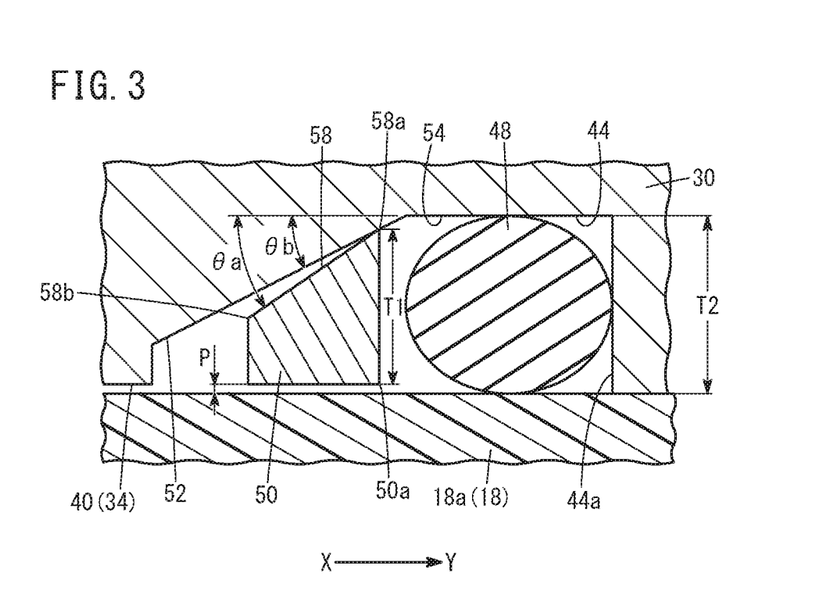
FIG. 3 is an explanatory view showing a seal member and a back-up member in a state where a pressing force is not applied.

As shown in FIGS. 2 and 3, in the seal groove 44, a seal member 48 and a back-up member 50 disposed on the upstream side of the seal member 48 in the supply direction are provided. A tapered groove surface 52 of a tapered shape is formed on a surface of the seal groove 44 facing toward the back-up member 50, and becomes apart from the outer circumferential surface of the thin portion 18a from the upstream side to the downstream side in the supply direction. That is, an inner circumferential surface of the seal groove 44 includes the tapered groove surface 52 and a constant diameter surface 54 formed on the downstream of the tapered groove surface 52 in the supply direction and having a substantially constant inner diameter in the axial direction.

As the seal member 48, for example, an O ring can be used. The thickness or the like in the radial direction of this seal member 48 is set according to a relationship with a distance (seal gap) between the constant diameter surface 54 and the outer circumferential surface of the thin portion 18a. The seal member 48 is disposed in a compressed state between the constant diameter surface 54 of the seal groove 44 and the outer circumferential surface of the thin portion 18a. Thus, the outer circumferential surface of the cylindrical portion 18 and the inner circumferential surface of the supply/discharge hole 34 of the cap 30 are sealed.

As the back-up member 50, for example, a back-up ring can be used. A surface of the back-up member 50 facing toward the tapered groove surface 52 of the seal groove 44 is provided with a tapered member surface 58 of a tapered shape whose diameter expands from the upstream side to the downstream side in the supply direction.

As shown in FIG. 3, a maximum thickness T1 in the radial direction of the back-up member 50 is smaller than a maximum depth T2 of a portion at which the tapered groove surface 52 of the seal groove 44 is formed. In the present embodiment, the maximum depth T2 of the portion at which the tapered groove surface 52 of the seal groove 44 is formed is the same as a depth of a portion at which the constant diameter surface 54 is formed. Hence, as described below, in a state where a pressing force toward the upstream side in the supply direction is not applied to the back-up member 50, a gap P is formed between the outer circumferential surface of the thin portion 18a and the back-up member 50.

An inclination angle θa of the tapered member surface 58 with respect to the axial direction of the back-up member 50 is greater than an inclination angle θb of the tapered groove surface 52 with respect to the axial direction of the supply/ discharge hole 34. Hence, in a state where the pressing force toward the upstream side in the supply direction is not applied to the back-up member 50, the tapered groove surface 52 is separated from the tapered member surface 58. That is, the tapered member surface 58 is disposed such that an end portion 58a on the downstream side in the supply direction is in contact with the tapered groove surface 52, and a separation distance between the tapered member surface 58 and the tapered groove surface 52 increases toward the upstream side in the supply direction.

When the pressing force toward the upstream side in the supply direction is applied to the back-up member 50 as described below, the tapered member surface 58 is aligned with the tapered groove surface 52 (see FIG. 5). In this state, the shape of the back-up member 50 is further preferably set to satisfy the following relationship.

Figure 5:
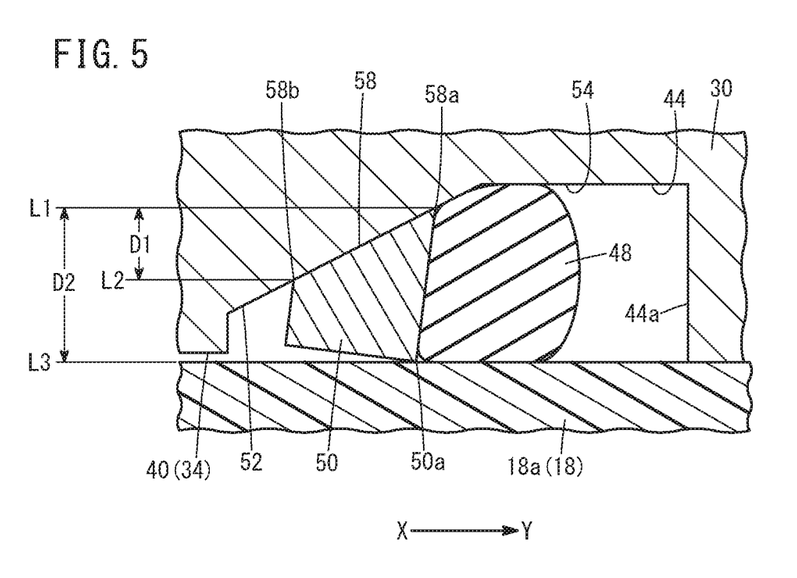
FIG. 5 is an explanatory view showing the seal member and the back-up member in a state where the pressing force is applied toward an upstream side in the supply direction.

That is, as shown in FIG. 5, D1 is a distance between a first line L1 extending along the axial direction of the supply/discharge hole 34 and passing through the end portion 58a of the tapered member surface 58 on the downstream side in the supply direction, and a second line L2 extending along the axial direction of the supply/discharge hole 34 and passing through an end portion 58b of the tapered member surface 58 on the upstream side in the supply direction. D2 is a distance between the first line L1 and a third line L3 extending along the axial direction of the supply/discharge hole 34 and passing through an end portion 50a of the back-up member 50 on the downstream side in the supply direction, facing toward the outer circumferential surface of the thin portion 18a. In this case, D1 is preferably equal to or greater than half of D2 (D1≥0.5D2).

As shown in FIGS. 1 and 2, on the downstream of the seal groove 44 in the supply direction, the male screw 18b and the female screw 46 are screwed to form a joined portion 60 that joins the outer circumferential surface of the cylindrical portion 18 to the inner circumferential surface of the large inner diameter hole 40.

Inside the large inner diameter hole 40, a collar 62 is disposed to support the cylindrical portion 18. The collar 62 is made of metal, for example, and includes a head portion 64 of an annular shape and a cylinder portion 66 of a cylindrical shape integrally formed with the head portion 64 as shown in FIG. 2. A passage hole 68 is formed in a penetrating manner in the collar 62 along the axial direction of the cylinder portion 66.

A circumferential surface of the head portion 64 is formed in a tapered shape whose diameter expands from one end surface on the upstream side to the other end surface on the downstream side in the supply direction. In the large inner diameter hole 40, the one end surface of the head portion 64 comes into contact with a step surface formed between the small inner diameter hole 42 and the large inner diameter hole 40, and the other end surface of the head portion 64 comes into contact with the distal end surface of the cylindrical portion 18.

The cylinder portion 66 is inserted on an inner side of the cylindrical portion 18, so that the passage hole 68 communicates with the middle inner diameter hole 38 and the small inner diameter hole 42 of the supply/discharge hole 34 and the interior of the liner 14. An outer circumferential surface of the cylinder portion 66 extends along the inner circumferential surface of the large inner diameter hole 40 with the cylindrical portion 18 interposed therebetween. That is, the cylindrical portion 18 is sandwiched between the outer circumferential surface of the cylinder portion 66 and the inner circumferential surface of the large inner diameter hole 40.

From a viewpoint to sandwich the cylindrical portion 18 more suitably, the cylinder portion 66 is preferably press-fitted in the cylindrical portion 18. In this case, the cylinder portion 66 presses the cylindrical portion 18 toward the inner circumferential surface of the large inner diameter hole 40. Then, the outer circumferential surface of the cylindrical portion 18 comes into pressing contact with the inner circumferential surface of the large inner diameter hole 40. Consequently, it is easy to keep the seal gap constant.

As described above, the collar 62 employs a simple configuration including only the head portion 64 and the cylinder portion 66, and therefore can be easily attached to the large inner diameter hole 40 and the cylindrical portion 18.

The high pressure tank 10 according to the present embodiment is basically configured as described above. As described above, in this high pressure tank 10, the high pressure hose is connected with the middle inner diameter hole 38 of the cap 30 to supply the hydrogen gas from a hydrogen supply source (not shown) into the liner 14 via the high pressure hose, the supply/discharge hole 34 and the passage hole 68. When the hydrogen gas supplied in this way pressurizes the interior of the high pressure tank 10, the hydrogen gas enters the seal groove 44 from the upstream side in the supply direction.

Figure 4:
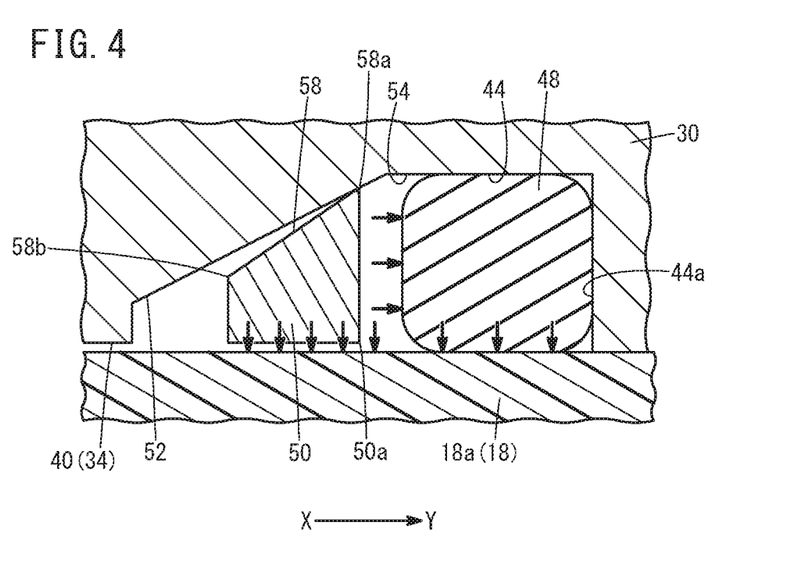
FIG. 4 is an explanatory view showing the seal member and the back-up member in a state where the pressing force is applied toward a downstream side in a supply direction.

Thus, as shown in FIG. 4, the seal member 48 is brought into pressing contact with the inner wall 44a of the seal groove 44 on the downstream side in the supply direction, and compressed and deformed. Consequently, it is possible to make the seal member 48 in tighter contact with the outer circumferential surface of the thin portion 18a and the constant diameter surface 54 of the seal groove 44. That is, it is possible to suitably seal the outer circumferential surface of the cylindrical portion 18 and the inner circumferential surface of the supply/discharge hole 34.

Hence, as described above, a gap acting as the hydrogen gas path is formed between the large inner diameter hole 40 (supply/discharge hole 34) and the outer circumferential surface of the thin portion 18a on the upstream of the seal groove 44 in the supply direction. Consequently, it is possible to effectively guide the hydrogen gas from the upstream side in the supply direction to the seal groove 44, and improve the sealability of the seal member 48.

In this case, the pressing force toward the upstream side in the supply direction is not applied to the back-up member 50. Therefore, as described above, the gap P (see FIG. 3) is kept formed between the outer circumferential surface of the thin portion 18a and the back-up member 50. That is, the hydrogen gas also enters the gap P in the seal groove 44. It is possible to make the pressing force of the hydrogen gas act on a portion of the outer circumferential surface of the thin portion 18a at which the seal member 48 is not pressed.

Consequently, it is possible to produce the surface pressure substantially evenly in the entire outer circumferential surface of the thin portion 18a facing toward the seal groove 44. Also, it is possible to avoid the pressing force from concentrating on the portion of the thin portion 18a at which the seal member 48 is pressed. As a result, the thin portion 18a can be prevented from contracting and deforming due to creep. That is, it is possible to prevent an increase in the distance (seal gap) between the outer circumferential surface of the thin portion 18a and the inner circumferential surface of the seal groove 44. Therefore, it is possible to provide suitable sealability for a long period of time.

Meanwhile, the hydrogen gas contained in the liner 14 can be discharged via an on-off valve attached to the middle inner diameter hole 38, and is supplied to a pipe connected with the fuel cell system (none of which is shown). When the hydrogen gas is discharged to depressurize the interior of the high pressure tank 10 in this way, the hydrogen gas inside the seal groove 44 is discharged from the upstream side in the supply direction, or the hydrogen gas having passed through the liner 14 and entered between the liner 14 and the reinforced layer 12 reaches the interior of the seal groove 44 from the downstream side in the supply direction. Thus, in the seal groove 44, the internal pressure on the downstream of the seal member 48 becomes higher than the internal pressure on the upstream side in the supply direction.

As a result, as shown in FIG. 5, the pressing force is applied to the seal member 48 from the downstream side to the upstream side in the supply direction. Thus, the seal member 48 is placed in pressing contact with the back-up member 50.

The back-up member 50 to which the pressing force has been applied via the seal member 48 has the tapered member surface 58 come into pressing contact with the tapered groove surface 52 of the seal groove 44. Consequently, it is possible to generate a force component in the radial direction in the back-up member 50.

When a pressing force is applied to the back-up member 50 toward the upstream side in the supply direction, the tapered member surface 58 that has been apart from the tapered groove surface 52 on the upstream in the supply direction comes close to the tapered groove surface 52. Then, the entire tapered member surface 58 deforms to come into contact with the tapered groove surface 52.

In this case, the distance D1 between the first line L1 and the second line L2, and the distance D2 between the first line L1 and the third line L3 satisfies the above-mentioned relationship. Therefore, when deformed as described above, the back-up member 50 can keep the end portion 58a in contact with the tapered groove surface 52, and easily make the end portion 50a come into contact with the outer circumferential surface of the thin portion 18a.

That is, even when the maximum thickness T1 in the radial direction of the back-up member 50 is made smaller than the maximum depth T2 of the seal groove 44, in a state where the pressing force toward the upstream side in the supply direction is applied, the back-up member 50 can have both end portions 58a, 50a in the radial direction on the side facing toward the seal member 48 suitably and closely contact with the tapered groove surface 52 and the outer circumferential surface of the thin portion 18a, respectively.

A case where a pressing force toward the upstream side in the supply direction is applied to a back-up member 70 having a relationship that a distance D1a between the first line L1 and the second line L2 and a distance D2a between the first line L1 and the third line L3 does not satisfy the above-mentioned relationship, i.e., D1a is smaller than half of D2a (D1a<0.5D2a) will be described with reference to FIGS. 6A and 6B. The seal member 48 is omitted from FIGS. 6A and 6B. Components shown in FIGS. 6A and 6B having the same or similar functions and effects as those of the components shown in FIGS. 1 to 5 will be assigned with the same reference numerals, and will not be described in detail.

Figure 6A:
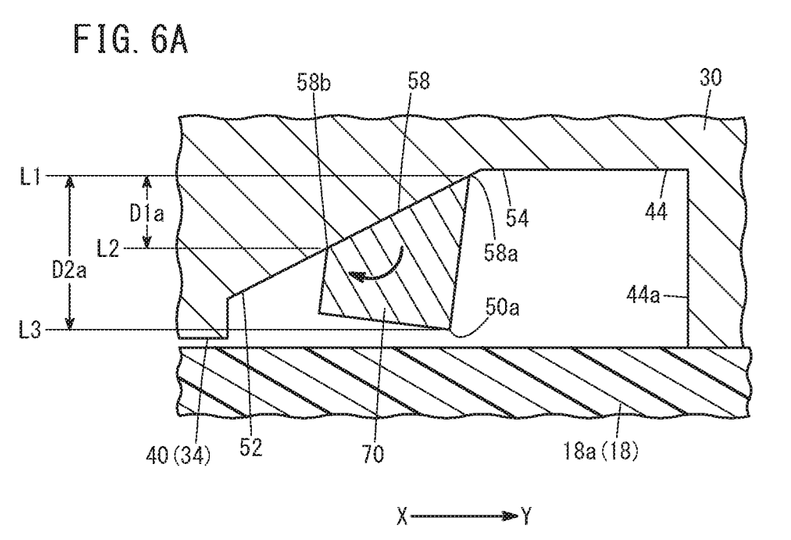
FIG. 6A is an explanatory view for explaining a moment generated in the back-up member.
Figure 6B:
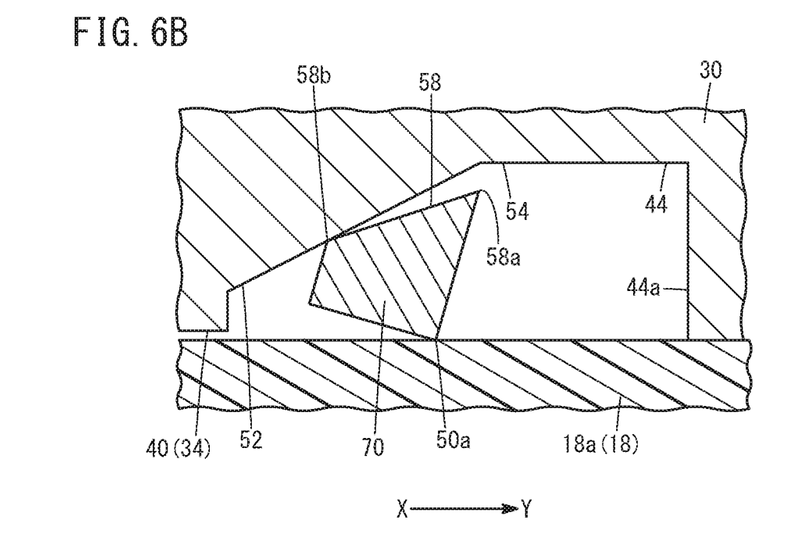
FIG. 6B is an explanatory view for explaining a moment generated in the back-up member.

When the entire tapered member surface 58 is deformed to come into contact with the tapered groove surface 52, this back-up member 70 is likely to generate a moment as shown by the curved arrow in FIG. 6A. Thus, when the back-up member 70 is deformed to further rotates as shown in FIG. 6B, there is a concern that the tight contact between the end portion 58a and the tapered groove surface 52 may be easily loosened.

Hence, from a viewpoint of further enhancing the tight contact between the end portions 58a, 50a of the back-up member 50 and the tapered groove surface 52 and the outer circumferential surface of the thin portion 18a, D1 and D2 preferably satisfy the relationship of $D1 \geq 0.5 D2$.

As described above, even when the pressing force toward the upstream side in the supply direction is applied to the seal member 48, this high pressure tank 10 can avoid the seal member 48 from protruding in the gap between the outer circumferential surface of the thin portion 18a and the inner circumferential surface of the supply/discharge hole 34 on the upstream of the seal groove 44 in the supply direction. Moreover, the seal member 48 is also effectively prevented from protruding between either the end portion 58a of the back-up member 50 in the radial direction and the tapered groove surface 52 of the seal groove 44 or the end portion 50a of the back-up member 50 and the outer circumferential surface of the thin portion 18a.

Consequently, the high pressure tank 10 does not need to use a special seal member that can withstand a stress caused by the protrusion, and increase the number of times of maintenance. As a result, with the simple configuration, the liner 14 (the outer circumferential surface of the cylindrical portion 18) and the cap 30 (the inner circumferential surface of the supply/discharge hole 34) are well-sealed for a long period of time.

The present invention is not limited to the embodiment in particular, and can be variously modified without departing from the scope of the invention.

For example, in the high pressure tank 10 according to the embodiment, the maximum thickness T1 in the radial direction of the back-up member 50 is smaller than the maximum depth T2 of the portion at which the tapered groove surface 52 of the seal groove 44 is formed, yet is not limited to this in particular. T1 and T2 may be the same, or T2 may be set slightly larger than T1.

What is claimed is:

1. A high pressure tank comprising:
a resin liner configured to contain a fluid; and
a cap including a supply/discharge hole, formed in the cap, configured to allow for supplying and discharging the fluid to and from the liner, wherein:
a cylindrical portion is formed with the liner in a protruding manner, in a state where the cylindrical portion is inserted in the supply/discharge hole, a direction from a distal end to a proximal end of the cylindrical portion is a supply direction of the fluid for the liner;
a seal groove is formed in an inner circumferential surface of the supply/discharge hole, a seal member configured to seal a gap between the inner circumferential surface of the supply/discharge hole and an outer circumferential surface of the cylindrical portion and a back-up member disposed on an upstream side of the seal member in the supply direction are provided in the seal groove;
the seal groove has a tapered groove surface facing toward the back-up member, the tapered groove surface being apart from the outer circumferential surface of the cylindrical portion from an upstream side to a downstream side in the supply direction; and
the back-up member has a tapered member surface facing toward the tapered groove surface, the tapered groove surface having a diameter expanding from the upstream side to the downstream side in the supply direction, wherein:

an inclination angle of the tapered member surface with respect to an axial direction of the back-up member is larger than an inclination angle of the tapered groove surface with respect to the axial direction of the supply/discharge hole; and in a state where the tapered member surface is aligned with the tapered groove surface, a distance between a first line and a second line is equal to or greater than half of a distance between the first line and a third line, the first line extending along the axial direction of the supply/discharge hole and passing through one end of the tapered member surface on the downstream side in the supply direction, the second line extending along the axial direction of the supply/discharge hole and passing through another end of the tapered member surface on the upstream side in the supply direction, the third line extending along the axial direction of the supply/discharge hole and passing through an end portion of the back-up member on the downstream side in the supply direction, facing toward the outer circumferential surface of the cylindrical portion.

2. The high pressure tank according to claim 1, wherein a maximum thickness in a radial direction of the back-up member is smaller than a maximum depth of a groove formed by the tapered groove surface of the seal groove.

\* \* \* \* \*